(12) United States Patent
Cohen et al.

(10) Patent No.: US 10,260,254 B2
(45) Date of Patent: Apr. 16, 2019

(54) MECHANISM FOR TRANSMITTING A TORQUE APPLIED TO A HANDLE AND A METHOD FOR OPERATING A MECHANISM FOR TRANSMITTING A TORQUE APPLIED TO A HANDLE

(71) Applicant: TNBT HOLDINGS PTY LTD, Minchinbury (AU)

(72) Inventors: Marc Cohen, Bellevue Hill (AU); Zsolt Szarka-Kovacs, Dee Why (AU); Daniel Mascia, North Parramatta (AU); Jonathon Woodcock, Bondi Junction (AU); Attila Bertok, East Ryde (AU)

(73) Assignee: TNBT HOLDINGS PTY LTD, Minchinbury (AU)

( * ) Notice: Subject to any disclaimer, the term of this patent is extended or adjusted under 35 U.S.C. 154(b) by 0 days.

(21) Appl. No.: 15/756,604

(22) PCT Filed: Sep. 2, 2016

(86) PCT No.: PCT/AU2016/050829
§ 371 (c)(1),
(2) Date: Mar. 1, 2018

(87) PCT Pub. No.: WO2017/035598
PCT Pub. Date: Mar. 9, 2017

(65) Prior Publication Data
US 2018/0209169 A1    Jul. 26, 2018

(30) Foreign Application Priority Data
Sep. 2, 2015 (AU) ................................ 2015903592

(51) Int. Cl.
*E05B 13/00* (2006.01)
*E05B 63/10* (2006.01)
(Continued)

(52) U.S. Cl.
CPC ............ *E05B 13/005* (2013.01); *E05B 1/003* (2013.01); *E05B 15/0013* (2013.01);
(Continued)

(58) Field of Classification Search
CPC ........ E05B 13/00; E05B 13/005; E05B 1/003; E05B 15/0013; E05B 17/0058;
(Continued)

(56) References Cited

U.S. PATENT DOCUMENTS

| 3,817,361 A | * | 6/1974 | Lundqvist | .............. G05G 1/082 |
| | | | | 192/69.1 |
| 4,655,059 A | | 4/1987 | Best et al. | |

(Continued)

OTHER PUBLICATIONS

International Search Report dated Nov. 22, 2016 in related International Application No. PCT/AU2016/050829.
(Continued)

*Primary Examiner* — David H Bollinger
(74) *Attorney, Agent, or Firm* — Eric L. Lane; Green Patent Law

(57) ABSTRACT

Disclosed herein is a mechanism (10) for transmitting a torque applied to a handle (12). The mechanism (10) comprises a torque transmitter (18). The torque transmitter (18) is for transmitting the torque applied to the handle (12) coupled thereto. The mechanism (10) comprises a torque transmitter stop (40) within the housing (14). The torque transmitter (18) and the torque transmitter stop (40) are cooperatively arranged for the torque transmitter stop (40) and the torque transmitter (18) to engage to arrest a torque transmitter rotation. The torque transmitter (18) and the torque transmitter stop (40) are cooperatively arranged for the torque transmitter stop (40) and the torque transmitter (18) to disengage when the torque so applied exceeds a predetermined torque value. Also disclosed herein is a
(Continued)

method for operating the mechanism (10) for transmitting a torque applied to the handle (12).

16 Claims, 14 Drawing Sheets

(51) Int. Cl.
  *E05C 1/16* (2006.01)
  *E05B 15/00* (2006.01)
  *E05B 17/00* (2006.01)
  *E05B 1/00* (2006.01)
  *E05B 17/20* (2006.01)
  *F16H 25/18* (2006.01)

(52) U.S. Cl.
  CPC .......... *E05B 17/0058* (2013.01); *E05B 17/20* (2013.01); *E05B 63/10* (2013.01); *E05C 1/163* (2013.01); *F16H 25/18* (2013.01)

(58) Field of Classification Search
  CPC .......... E05B 17/20; E05B 63/10; B60T 7/047; B60T 7/08; B60T 7/10; B60T 7/104; G05G 5/08; E05C 1/163; F16H 25/18
  USPC .............. 74/529, 532, 545, 548, 479.01
  See application file for complete search history.

(56) References Cited

U.S. PATENT DOCUMENTS

| | | | |
|---|---|---|---|
| 4,773,240 A | 9/1988 | Foshee | |
| 5,617,749 A | 4/1997 | Park | |
| 5,787,744 A * | 8/1998 | Berger | E05B 17/0058 292/350 |
| 5,904,232 A * | 5/1999 | Shen | E05B 13/101 192/69.62 |
| 5,934,117 A * | 8/1999 | Shen | E05B 55/06 70/149 |
| 2002/0113445 A1 | 8/2002 | Brown | |
| 2004/0134245 A1 | 7/2004 | Jasper | |
| 2009/0031771 A1* | 2/2009 | Yamaguchi | E05B 85/16 70/369 |
| 2011/0248518 A1* | 10/2011 | Tien | E05B 13/005 292/336.3 |
| 2012/0223534 A1* | 9/2012 | Min | E05B 13/005 292/220 |
| 2013/0015672 A1* | 1/2013 | Nadgouda | E05B 13/005 292/224 |
| 2013/0168978 A1* | 7/2013 | Huang | E05B 47/068 292/336.3 |

OTHER PUBLICATIONS

Written Opinion dated Nov. 22, 2016 in related International Application No. PCT/AU2016/050829.

* cited by examiner

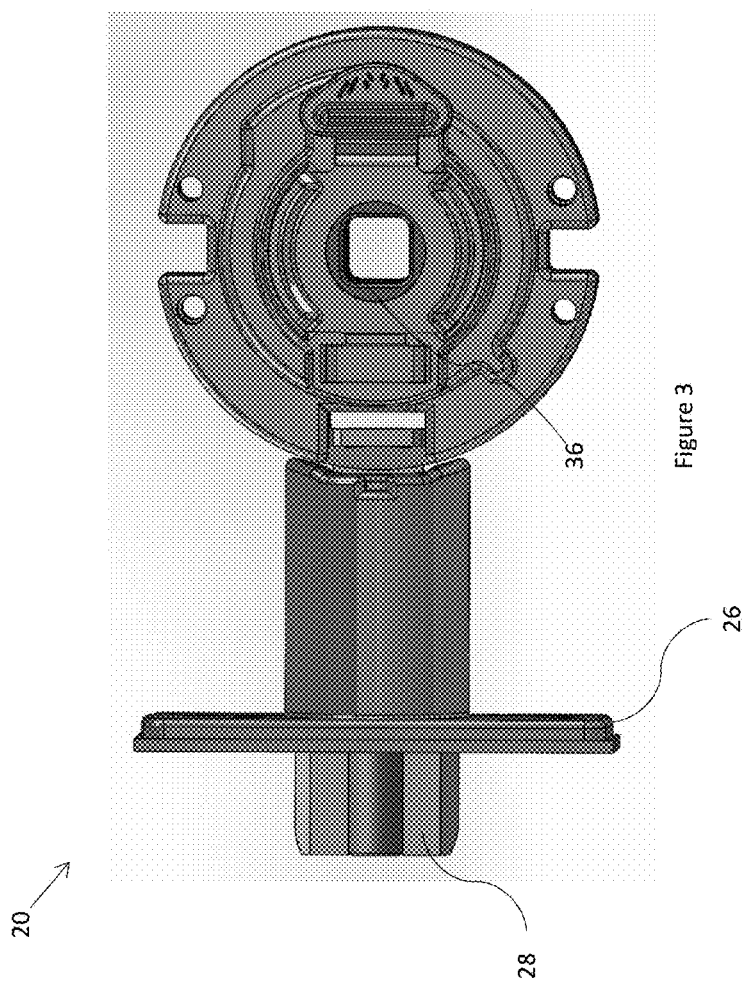
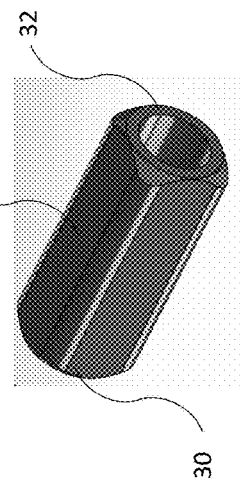
Figure 3
Figure 4

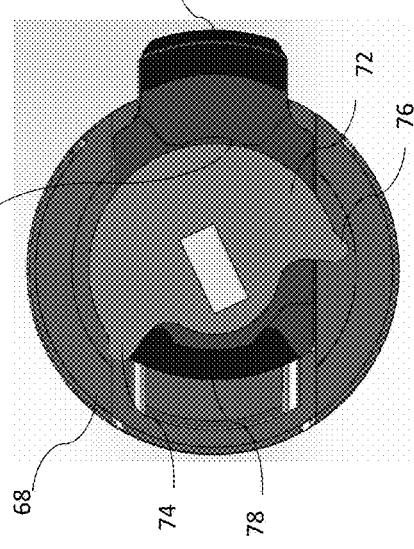
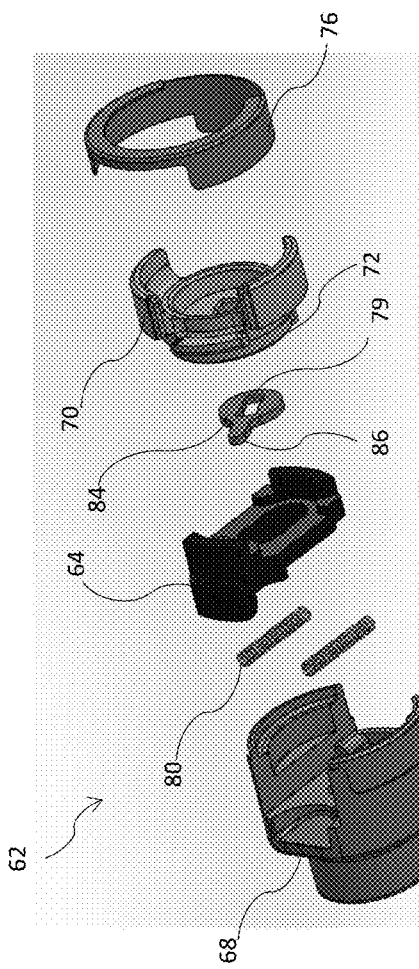
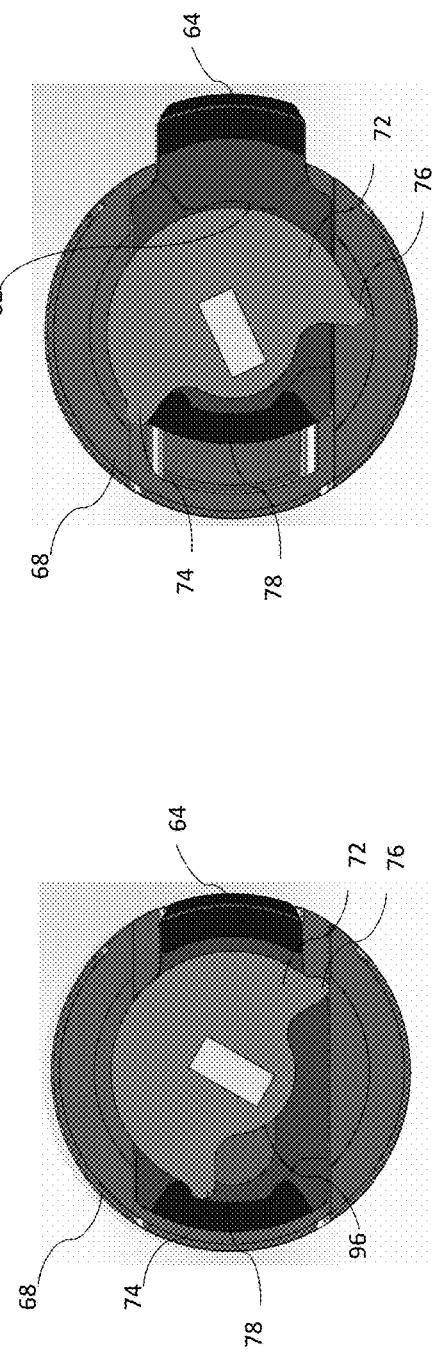

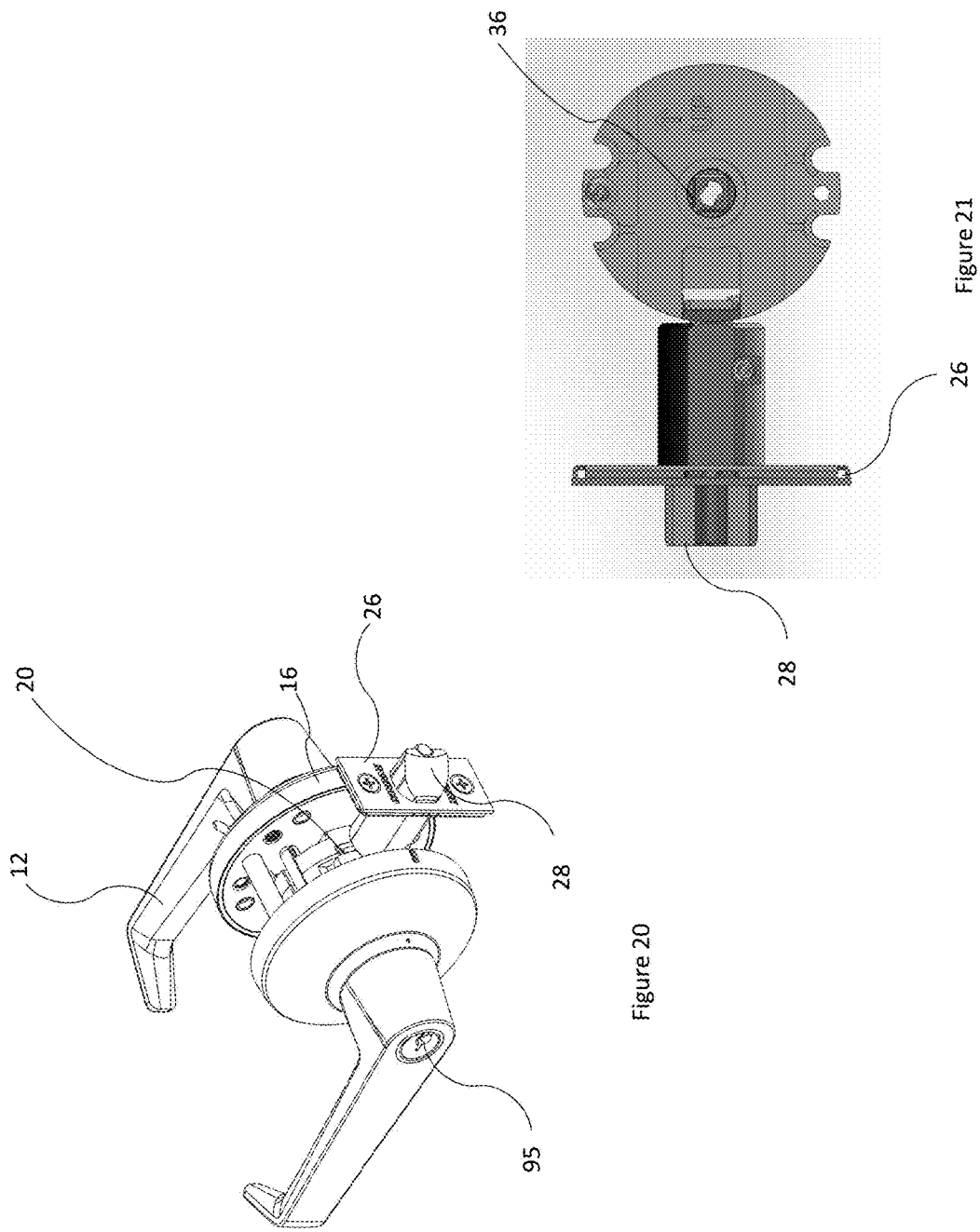

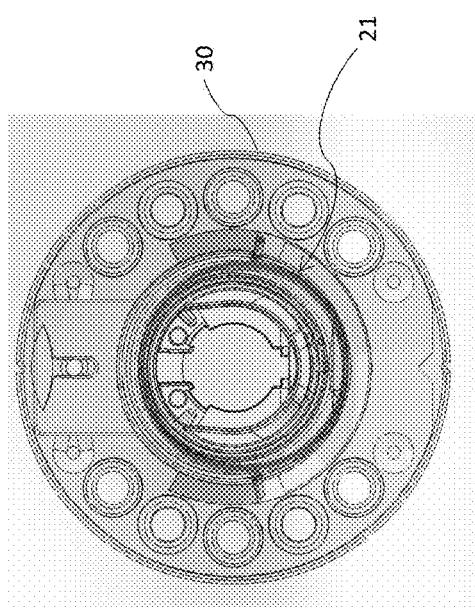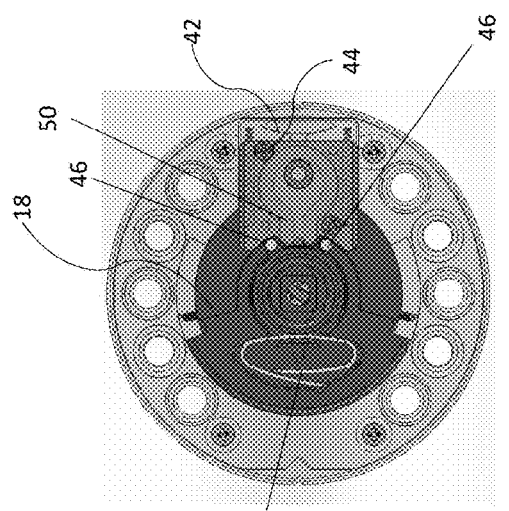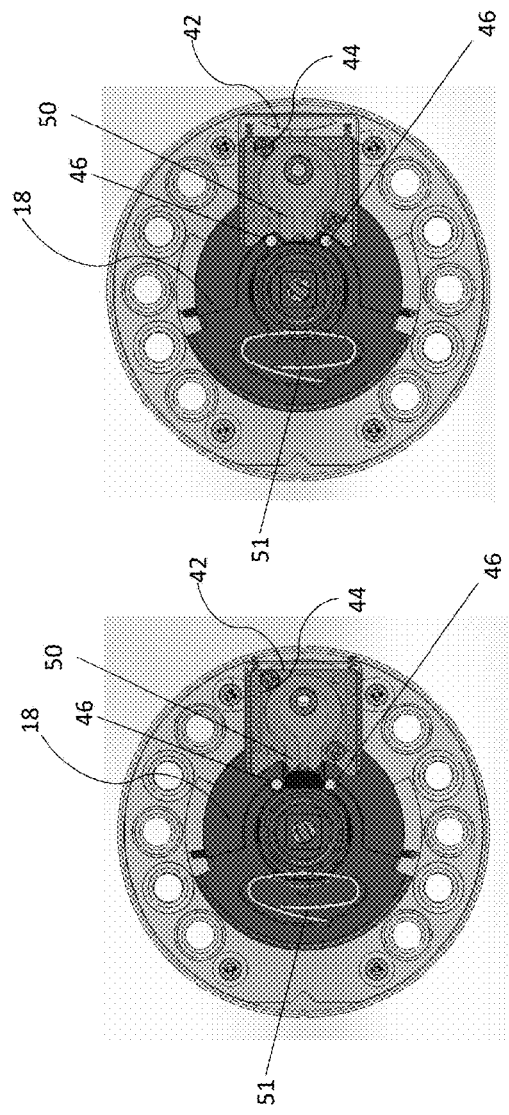

MECHANISM FOR TRANSMITTING A TORQUE APPLIED TO A HANDLE AND A METHOD FOR OPERATING A MECHANISM FOR TRANSMITTING A TORQUE APPLIED TO A HANDLE

TECHNICAL FIELD

The disclosure herein generally, but not exclusively, relates to a mechanism for transmitting a torque applied to a handle and a method for operating a mechanism for transmitting a torque applied to a handle.

BACKGROUND

A hinged barrier in the form of, for example, a door or gate, may have a locking mechanism. Examples of locking mechanisms include but are not limited to locksets. A locking mechanism may have an unlocked configuration in which operation of a handle, for example a knob or a lever, operates a latch mounted to the door, and a locked configuration in which the handle is uncoupled from the latch so that operation of the handle does not operate the latch.

In the locked configuration, the handle may be freely rotated without significant resistance. Force applied to the handle (by, for example, being hit by a hammer or other object) in an attempt to break the mechanism and force entry may be reduced in the locked configuration. This is because the force may not be transmitted within the mechanism to the latch. Unfortunately, this behaviour may not be expected, especially by a new user or prospective purchaser. That is, in the locked configuration, the locking mechanism may not provide the expected feedback to a user who expects to be unable to rotate the handle. Consequently, the user may be confused, mistrust the locking mechanism, or mistakenly believe that the locking mechanism is broken.

SUMMARY

Disclosed herein is a mechanism for transmitting a torque applied to a handle. The mechanism comprises a housing. The mechanism comprises a torque transmitter for transmitting the torque applied to the handle coupled thereto and having at least a portion within the housing. The mechanism comprises a torque transmitter stop within the housing. The torque transmitter and the torque transmitter stop are cooperatively arranged for the torque transmitter stop and the torque transmitter to engage to arrest a torque transmitter rotation and further arranged for the torque transmitter stop and the torque transmitter to disengage when the torque so applied exceeds a predetermined torque value.

A user operating the handle may be reassured by of a rotation of the handle coupled to the torque transmitter being arrested, however the handle may give way when violently turned in an attempt to force entry, which may reduce the chance of damage to the mechanism or a successful forced entry.

In an embodiment, the torque transmitter and the torque transmitter stop are cooperatively arranged for the torque transmitter stop to engage the torque transmitter to arrest a torque transmitter rotation and to move away from the torque transmitter when the torque so applied exceeds a predetermined torque value.

In an embodiment, the torque transmitter stop is movably mounted within the housing. The torque transmitter may be arranged to cooperate with the torque transmitter stop to move the torque transmitter stop out of engagement with the torque transmitter when the torque so applied exceeds the predetermined torque value. The torque transmitter may comprise a cam. The torque transmitter stop may comprise a stop element. The cam and the stop element may be cooperatively arranged for the stop element to engage the cam to arrest the torque transmitter rotation. The stop element may be arranged to be reconfigured into a cam follower that is arranged to be moved by the cam out of engagement therewith when the torque so applied exceeds the predetermined torque. The stop element may be arranged to be reconfigured by the cam. The stop element may be arranged to be deflected by the cam to reconfigure the stop element to the cam follower. The stop element may comprise a resilient stop element. The resilient stop element may comprise a spring. Alternatively, the stop element may be pivotally mounted and pivotally biased by a resilient element. The torque transmitter stop may be slidingly mounted within the housing. The torque transmitter may be arranged to cooperate with the torque transmitter stop to slide the torque transmitter stop out of engagement with the torque transmitter when the torque so applied exceeds the predetermined torque value.

An embodiment is configured for the torque transmitter stop to be fixed relative to the housing when disengaged from the torque transmitter. The torque transmitter stop may comprise a passageway for a fastener. The housing may comprise a fastener receiver arranged for receiving the fastener when disposed in the passageway and when the torque transmitter stop is disengaged from the torque transmitter.

In an embodiment, the torque transmitter stop is biased by at least one biasing element towards the torque transmitter.

In an embodiment, the torque transmitter is configured for removable attachment of the handle thereto. Alternatively, the torque transmitter may have the handle attached thereto.

In an embodiment, the torque transmitter comprises a clutch operable to disable transmission of the torque applied to the handle. The clutch may be operable to enable transmission of the torque applied to the handle In an embodiment, the housing is configured to be attached to a hinged barrier for operation of a hinged barrier latch assembly.

Disclosed herein is a method for operating a mechanism for transmitting a torque applied to a handle. The method comprises the step of applying a torque to a handle coupled to a torque transmitter of the mechanism, the torque transmitter having at least a portion within a housing of the mechanism. The method comprises the step of stopping a rotation of the torque transmitter caused by the torque applied to the handle by engaging the torque transmitter with a torque transmitter stop which is in the housing. The method comprises the step disengaging the torque transmitter stop and the torque transmitter from each other when the torque so applied exceeds a predetermined torque value.

In an embodiment, the step of disengaging the torque transmitter stop and the torque transmitter from each other comprises the step of moving the torque transmitter stop away from the torque transmitter.

An embodiment comprises the step of the torque transmitter moving the torque transmitter stop out of engagement with the torque transmitter when the torque so applied exceeds the predetermined torque value. A cam of the torque transmitter may be engaged by a stop element of the torque transmitter stop to arrest the rotation of the torque transmitter. The stop element may be reconfigured into a cam follower that is moved by the cam out of engagement therewith when the torque so applied exceeds the predetermined torque. The cam may reconfigure the stop element into the cam follower. The cam may bend the stop element to reconfigure the stop element into the cam follower. The stop element may comprise a resilient stop element. The resilient stop element may comprise a spring.

An embodiment comprises the step of the torque transmitter cooperating with the torque transmitter stop to slide the torque transmitter stop out of engagement with the torque transmitter when the torque so applied exceeds the predetermined torque value.

An embodiment comprises the step of fixing the torque transmitter stop relative to the housing when disengaged from the torque transmitter.

An embodiment comprises the step of fixing the torque transmitter stop relative to the housing with a fastener.

An embodiment comprises the step of biasing the torque transmitter stop towards the torque transmitter.

An embodiment comprises the step of attaching a handle to the torque transmitter.

An embodiment comprises the step of operating a clutch to disable transmission of the torque applied to the handle.

An embodiment comprises the step operating the clutch to enable transmission of the torque applied to the handle.

An embodiment comprises the step of attaching the housing to a hinged barrier for operation of a hinged barrier latch.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which:

FIG. 3 shows a front elevational view of an example of a latch assembly.

FIG. 4 shows an example of an actuator for operationally coupling the mechanism of FIG. 1 and the latch assembly of FIG. 3.

FIGS. 13 to 18 show various views of the clutch of FIG. 10 and components of the clutch.

FIG. 20 shows a perspective view of another example of a lockset.

FIGS. 21 to 29 show parts of the lockset of FIG. 20.

FIG. 30 shows show an elevational view similar to that of FIG. 5.

FIGS. 31 and 32 elevational views of another embodiment in which the operation of a retractable key is shown.

DESCRIPTION OF EMBODIMENTS

Figure 2:
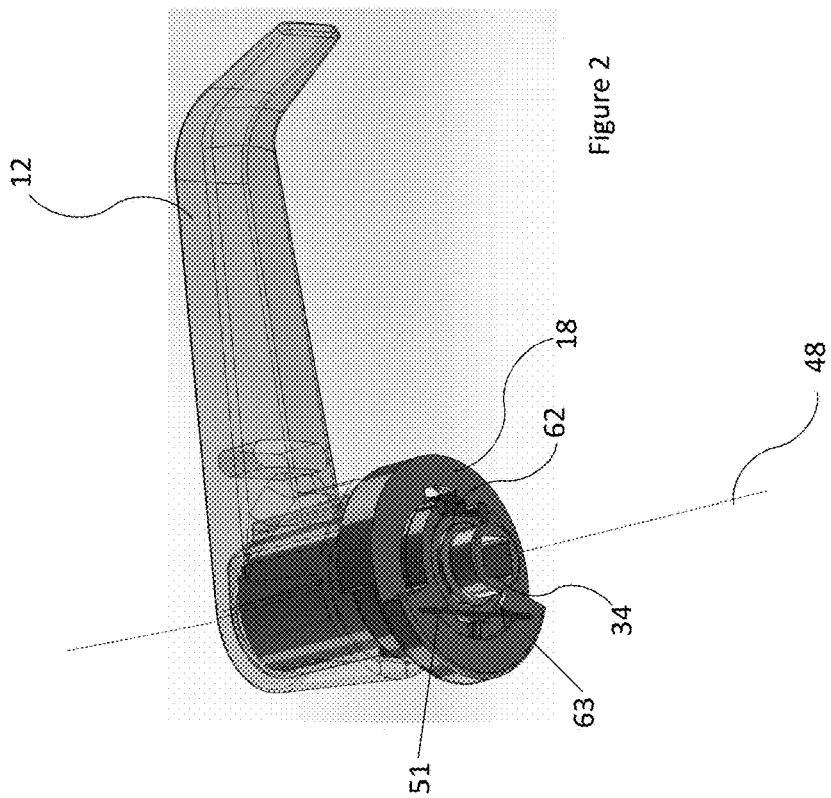
FIG. 2 shows a perspective view of a torque transmitter of the mechanism of FIG. 1.
Figure 1:
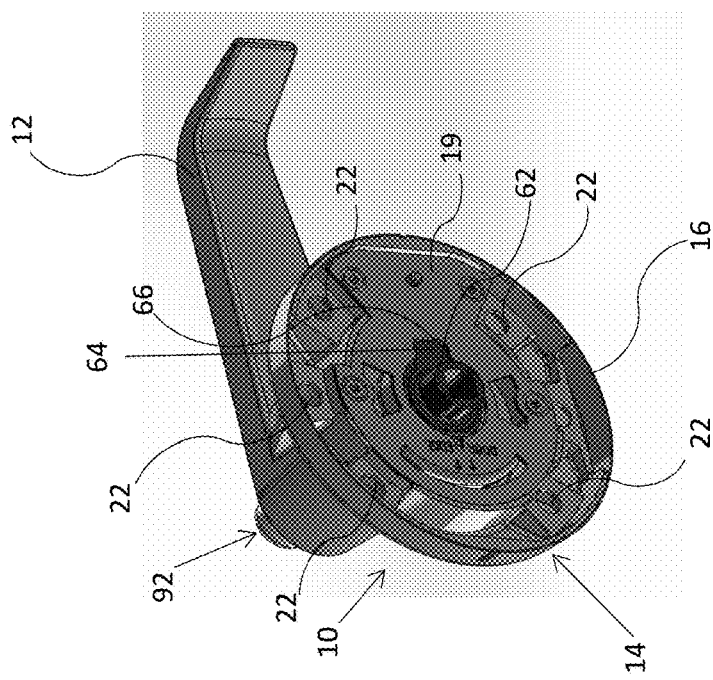
FIG. 1 shows a perspective view of an embodiment of a mechanism for transmitting a torque applied to a handle.

FIG. 1 shows a perspective view of a mechanism for transmitting a torque applied to a handle, the mechanism being generally indicated by the numeral 10 and the handle being indicated by the numeral 12. The mechanism comprises a housing 14 in the form of a rose 16 having a cavity and an optional plate 19 capping the cavity and fastened to the rose 16 with fasteners in the form of screws. The mechanism 10 comprises a torque transmitter 18, a perspective view of which is shown in FIG. 2. In FIG. 2, the handle 12 coupled to the torque transmitter 18 is shown in phantom for clarity. The torque transmitter 18 is for transmitting the torque applied to the handle 12 coupled thereto. The torque transmitter 18 has at least a portion within the housing 14. The mechanism 10 comprises a torque transmitter stop 40 within the housing 14. The torque transmitter 18 and the torque transmitter stop 40 are cooperatively arranged for the torque transmitter stop 40 and the torque transmitter 18 to engage to arrest a torque transmitter rotation. The torque transmitter 18 and the torque transmitter stop 40 are cooperatively arranged for the torque transmitter stop 40 and the torque transmitter 18 to disengage when the torque so applied exceeds a predetermined torque value.

FIG. 3 shows a front elevational view of an example of a latch assembly 20, although generally any suitable latch assembly may be used, for example a latch assembly in the form of a tie-bolt. In this embodiment, the torque transmitter 18 is in use operationally coupled to a latch bolt 28 for a hinged barrier, for example a door or a gate, so that the latch bolt 29 may be withdrawn by rotation of the handle 12. The torque transmitter 18 is in this, but not all embodiments, operationally coupled to the latch assembly 20 by an actuator 24 comprising a bar in the form of a hollow bar. The bar has a rectangular cross section—in this embodiment a square—with rounded or chamfered corners. Alternative embodiments have other cross sections, for example hexagonal. Generally, any suitable cross section may be used. One end 30 of the bar 24 is in use coupled to a coupler 34 of the torque transmitter 18 and another end 32 of the bar 24 is in use coupled to a coupler 36 of the latch assembly 20.

The housing 14 is in use generally but not necessarily disposed over a face-bore formed in the hinged barrier and fastened to the hinged barrier by fasteners in the form of screws disposed in screw holes 22 formed in the rose 16 and penetrating the hinged barrier. The latch assembly 20 is in use generally but not necessarily disposed within an edge bore formed in the door and the face boor. A face plate 26 of the latch assembly 20 is fastened to a mortise formed on the door edge and the latch bolt 28 of the latch assembly 20 extends outwardly from the edge bore. The edge bore opens into the face bore.

The torque transmitter 18 is in the form of a hollow shaft that is rotationally mounted within the rose 16 and held therein by the plate. As shown in FIG. 30, a torsion spring 21 mounted within the rose 16 rotationally biases the torque transmitter such that when the handle 12 is depressed downward from a starting orientation the torsion spring returns the handle 12 to the starting orientation.

The torque transmitter 18 is configured for removable attachment of the handle 12 thereto. The torque transmitter 18 and the handle 12 are configured to form a meshed joint in the form of a splined joint when the handle 12 is so coupled. One of the torque transmitter 18 and the handle 12 has a male spline (the handle 12 in this but not all embodiments), and the other of the torque transmitter and the handle 12 has a female spline. Alternatively, the torque transmitter 18 and the handle 12 may be configured to form a keyed joint, for example, or generally any suitable form of joint. A user, for example a locksmith may attach a handle to the torque transmitter. In an alternative embodiment, the torque transmitter has the handle attached thereto and may be integral thereto.

Figure 5:
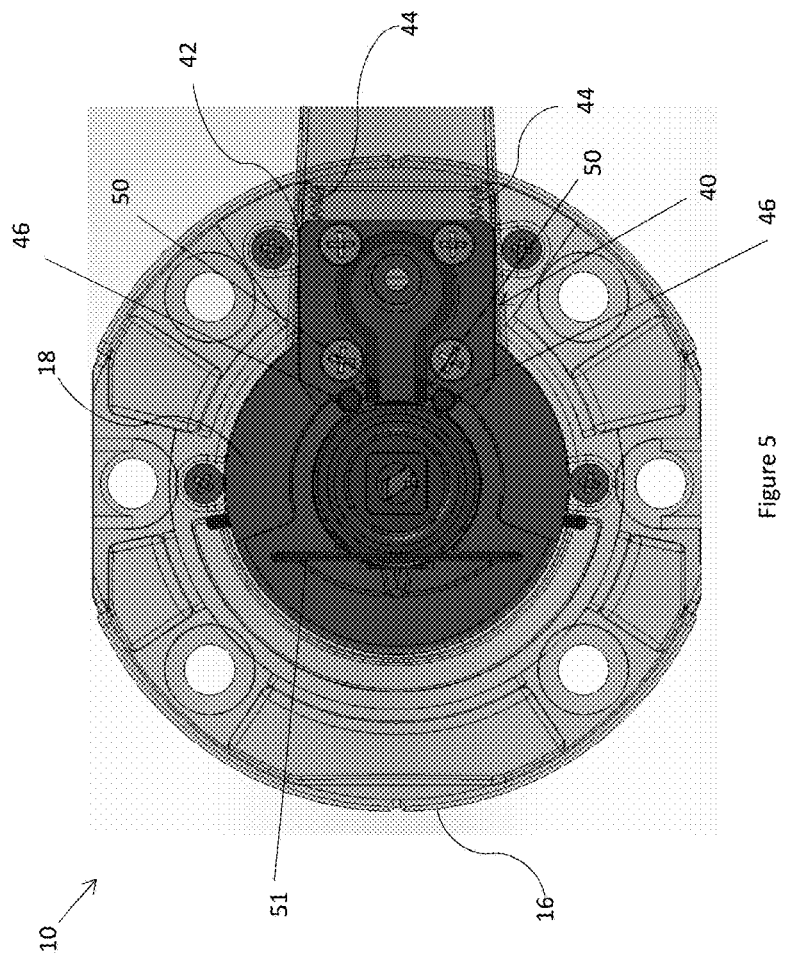
FIG. 5 shows an elevational view of the mechanism of FIG. 1 with a plate removed to reveal a torque transmitter stop.

FIG. 5 shows an elevational view of the mechanism 10 with the plate 18 removed to reveal a torque transmitter stop 40. In the present but not all embodiments, the torque transmitter stop 40 is configured to move away from the torque transmitter 18 to disengage from the torque transmitter 18 when the torque so applied exceeds the predetermined torque value. The torque transmitter stop 40 is movably mounted within the housing 14. In this but not all embodiments, the torque transmitter stop 40 comprises a carriage 42 received by a bearing formed in the rose 16. In this embodiment, the movement is a sliding movement in the form of a linear sliding movement, however in other embodiments the movement may be, for example, a rotation, or a combination of a rotation and a translation. The torque transmitter stop 40 is biased by at least one biasing element, in this embodiment a plurality of biasing elements, in the form of a compression springs 44 towards the torque transmitter. The biasing may be by any suitable biasing element, for example an extension spring or a block of elastomeric material.

Figure 7:
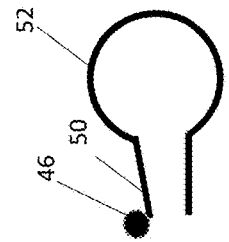
FIGS. 6 and 7 shows a stop element of the torque transmitter stop of FIG. 5 and a cam of the mechanism of FIG. 1.
Figure 6:
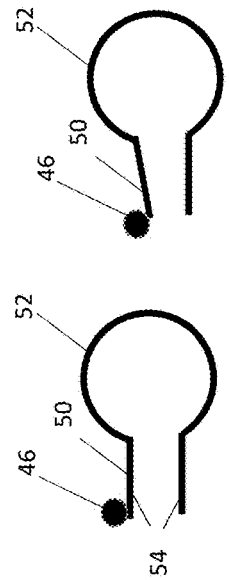

In this but not all embodiments, the torque transmitter 18 is arranged to cooperate with the torque transmitter stop 40 to move the torque transmitter stop 40 out of engagement with the torque transmitter 18 when the torque so applied exceeds the predetermined torque value. The movement of the torque transmitter stop 40 is outward, which is against the bias of the at least one biasing element 44. The torque transmitter 18 comprises a cam in the form of a pin 46 radially displaced from a rotational axis 48 of the torque transmitter 18. The pin 46 comprises steel for wear resistance, however it may comprise any suitable material including a polymer. The torque transmitter stop 40 may comprise a stop element 50. The cam 46 and the stop element 50 are in this embodiment cooperatively arranged for the stop element 50 to engage the cam 46 to arrest the torque transmitter 18 rotation. FIG. 6 shows a schematic diagram of the stop element 50 and the cam 46 engaged. The stop element 50 is arranged to be reconfigured into a cam follower 50, as shown in FIG. 7, that is arranged to be moved by the cam 46 out of engagement therewith when the torque so applied exceeds the predetermined torque. In this embodiment, the stop element 50 is deflected by the cam 46 to reconfigure the stop element 50 to the cam follower 50 shown, however the stop element may be otherwise deformed as suitable. Further rotation of the torque transmitter causes cam 46 to translate the follower 50 and the carriage 42 outward. The stop element 50 comprises a resilient stop element 52 in the form of a spring, for example a torsion spring as in this embodiment, a compression spring, a block of elastomeric material, or generally any suitable element. The resilient stop element 52 may, but not necessarily, be integral with the ends 54 of the stop element 50 that engage the cam 46. In this embodiment, the deflection is achieved by the cam 46 bending the step element 50. Alternatively, the stop element 50 may be pivotally mounted and pivotally biased by a resilient element. Generally, the stop element may arranged and mounted in any suitable way.

The mechanism 10 may be rotated 180 degrees around the axis 48 for mounting on the other side of the hinged barrier, in which case the mechanism is inverted. To accommodate this the mechanism has two cams and two stop elements.

Figure 9:
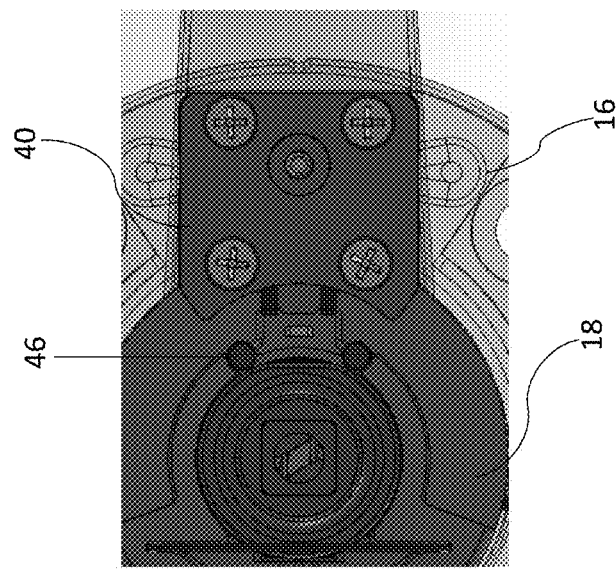
FIGS. 8 and 9 show back and front perspective views of a torque transmitter stop of the mechanism of FIG. 1.
Figure 8:
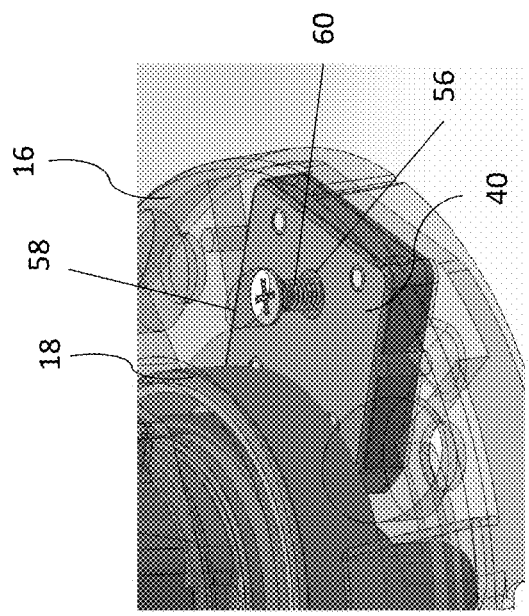

FIGS. 8 and 9 show back and front views of the torque transmitter stop 40, showing how the torque transmitter stop 40 may be fixed relative to the housing 14 when disengaged from the torque transmitter 18. The torque transmitter stop 40 comprises a passageway in the form of a passageway 56 for a fastener 60 in the form of a screw. Alternatively, the fastener may comprise a pin, for example a plastic pin. Generally any suitable fastener may be used. The housing 14, for example the rose 16, may comprise a fastener receiver in the form of a threaded passageway 58 arranged for receiving the fastener 60 when disposed in the passageway 56 and when the torque transmitter stop 40 is disengaged from the torque transmitter. A user, for example a locksmith, may slide the carriage 42 outwardly and then fix the torque transmitter stop 40 relative to the housing 14 when disengaged from the torque transmitter 18. The user may fix the torque transmitter 18 with the fastener 60. This will disable the stopping of the torque transmitter 18 by the torque transmitter stop 40, which may be desired in some circumstances by some users, for example to mimic the behaviour of a familiar lock.

Figure 10:
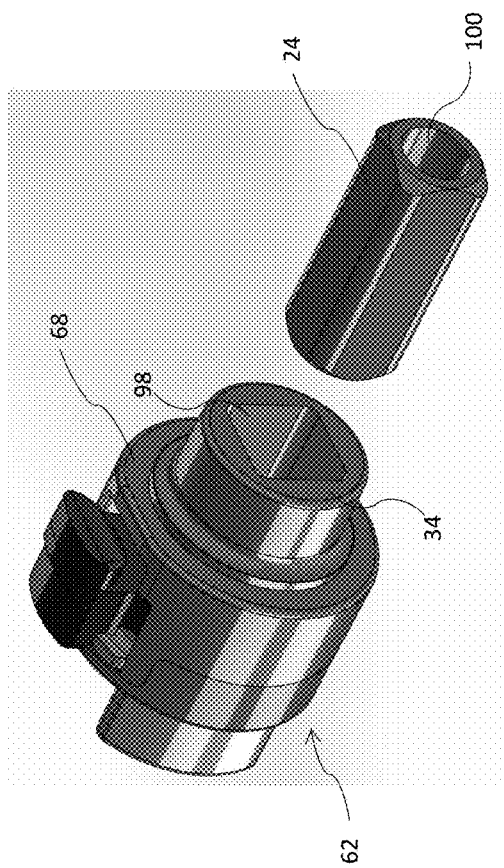
FIG. 10 shows a perspective view of one end of a clutch of the mechanism of FIG. 1.
Figure 12:
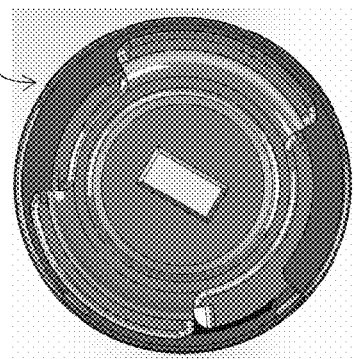
FIG. 12 shows an elevational view of the clutch of FIG. 10 in another mode.
Figure 11:
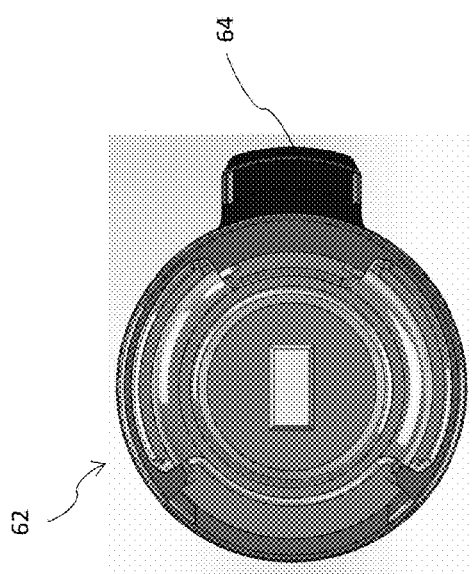
FIG. 11 shows an elevation view of the clutch of FIG. 10 in one mode.

The torque transmitter 18, in this but not all embodiments, comprises a clutch 62 operable to disable transmission of the torque applied to the handle 12. FIG. 10 shows a perspective view of one end of the clutch 62. The clutch 62 is also operable to enable transmission of the torque applied to the handle 12. FIG. 11 shows an elevation view of another end of the clutch 62 in one mode, and FIG. 12 shows the other end of the clutch of FIG. 10 in another mode in the same elevational view. The clutch 62 is operable to engage a clutch receiver 63 of the torque transmitter 18 while being received thereby for transmission of the torque. The clutch 62 is also operable to disengage the clutch receiver 63 while received thereby so that the torque is not transmitted. The clutch 62 in the one mode can interlock with the clutch receiver 63. The clutch 62 has a retractable key 64 and is operable to outwardly extend the retractable key 64 and also operable to retract the retractable key. In the one mode, the retractable key 64 is extended to be received by a key way 66 so interlocking the clutch 62 to the clutch receiver 63. When the retractable key 64 is extended it moves, in this embodiment pushes, the torque transmitter stop 40 out of the keyway 66 and out of engagement In the other mode, the retractable key 64 is retracted and so the clutch 62 is no longer interlocked with the clutch receiver 63. In the other mode, the clutch 62 is freely rotatable within an inner bearing surface of the clutch receiver 63, without transmission of rotation between the clutch 62 and the clutch receiver 63. In the other mode, the torque transmitter stop 40 is received by the keyway 66, as shown in FIG. 5. In an alternative embodiment, the torque transmitter stop 40 may not be received in the keyway; the torque transmitter stop may have any suitable arrangement. FIG. 31 shows another embodiment in which the retractable key is extended to be received by a key way and the torque transmitter stop is out of the keyway and out of engagement, and FIG. 32 shows an embodiment in which the retractable key is retracted. Parts in FIGS. 31 and 32 similar or identical in form and/or function to those described elsewhere herein are similarly numbered.

Figure 17:
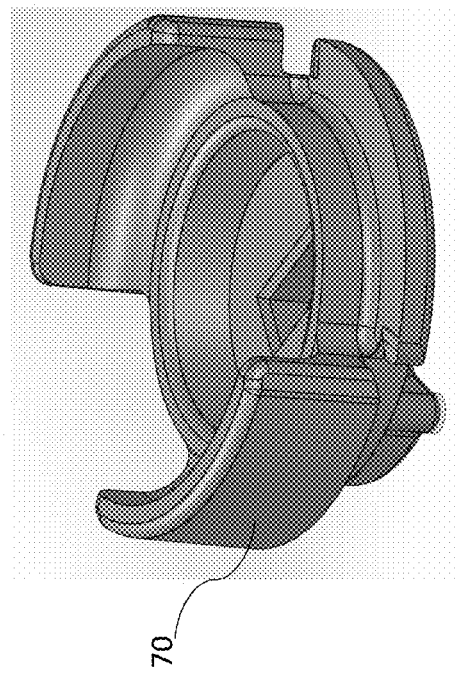
Figure 16:

FIG. 13 shows an exploded view of the clutch 62. The clutch 62 comprises a bearing component 68 on which the retractable key 64 is mounted. FIG. 14 shows a top view of the bearing component 68 with the retractable key 64 received thereby. The clutch 62 also has a cam component 70 configured to translate the retractable key 64 along the bearing component 68 when rotated relative to the bearing component 68, such that the retractable key 64 is driven inwardly along the bearing component. FIGS. 14 and 15 show a plan view of the retractable key 64 received by the bearing component 68 and engaged with a cam plate 72 of the cam component 70. When the cam component 70 is rotated relative to the bearing component 68, a cam plate lobe 74 or 76 of the cam plate 72 is followed by a bearing surface 78 in the form of a concave bearing surface of the retractable key 64. The cam plate lobe 74 or 76 pushes the following bearing surface 78 when rotated to retract the retractable key 64. FIGS. 16 and 17 show respective underside and top perspective views of the cam component 70.

In an alternative embodiment, the lobes 74, 76 may take the form of fingers, and/or the cam plate may be thickened to be more than a plate. Generally, the cam component 70 may take any suitable form.

As shown in FIG. 13, the clutch 62 comprises at least one biasing element in the form of at least one compression spring 80, in this embodiment two compression springs, although more than two compression springs may be used. One end of the compression springs 80 engage the bearing component 68 and another end of the compression springs 80 engage with the retractable key 64 to outwardly bias the retractable key 64. Alternative embodiments may have an extension spring to outwardly bias the retractable key 64, a leaf spring, a block of resilient material for example a block of rubber, or generally any suitable biasing element. In some alternative embodiments, the at least one biasing element 80 bias the retractable key 64 inward, and the cam 72 moves the retractable key 64 outward.

The cam plate 72 has a cavity 96 located between the cam plate lobes 74,76. The retractable key 64 may be camingly disengaged from the cam component 70 by disposing the bearing surface 72 between the cam plate lobes 74,76. In the context of this document, when the retractable key is camingly disengaged from the cam component, the retractable key and the cam component are arranged such that rotation of the cam component does not translate the retractable key. The bearing surface 78 is free to move into the cavity 96 when the bearing surface is so disposed. When the retractable key 64 is so disengaged from the cam component 70, the at least one biasing element 80 extends the retractable key 64. The key 64 may not be translated outwardly until the retractable key 64 is aligned with (i.e. at) the key way 66.

There is a risk that contamination of the clutch 62 with dirt or dust, for example, may prevent the at least one biasing element 80 translating the retractable key 64 outwardly. In the case of fire or other emergency, for example, it may be desirable to have an additional or alternative mechanism for extending the retractable key. As shown in FIG. 15, the retractable key 64 has another bearing surface 82. Between the bearing surface 78 and the other bearing surface 82 is disposed another cam 84 shown in FIG. 13. The other cam 84 is in the form of a cam plate comprising a lobe in the form of a finger 86 having a distal end that cooperates with the other bearing surface 82 to outwardly extend the retractable key 64 when the other cam 84 is rotated relative to the retractable key 64. The other cam 84 is mounted on a locking actuator 90 in the form of a flat bar that in use passes through the clutch 62 along a longitudinal axis 48 thereof. The locking actuator passes through slot 79, coupling the locking actuator 90 to the other cam 84. Operation of a user operated lock that may be mounted within the handle 12 instead of the push button assembly 92 (and which in this but not all embodiments comprises a cylinder lock mounted) rotates the locking actuator 90 which may in turn rotate the other cam 84. Consequently, if the at least one biasing element 80 is insufficient the other cam 84 may extend the retractable key when the user operated lock is operated to engage the clutch 62 with the torque transmitter 18. In an alternative embodiment, the user operated lock may comprise a wafer lock, or generally any suitable lock.

In this embodiment, the distal end of the finger 86 is round, however in an alternative embodiment it may be pointed. In another embodiment, the other cam 84 may be thicker than a plate. In an alternative embodiment, the other cam 84 is incorporated in the cam component 70. Generally, the other cam 84 may take any suitable form.

The clutch 62 has a cap 76 configured to be fixed to the bearing component 68 to form a housing in which to contain the compression springs 80, the retractable key 64, the cam component 70, and the other cam 84.

Figure 18:
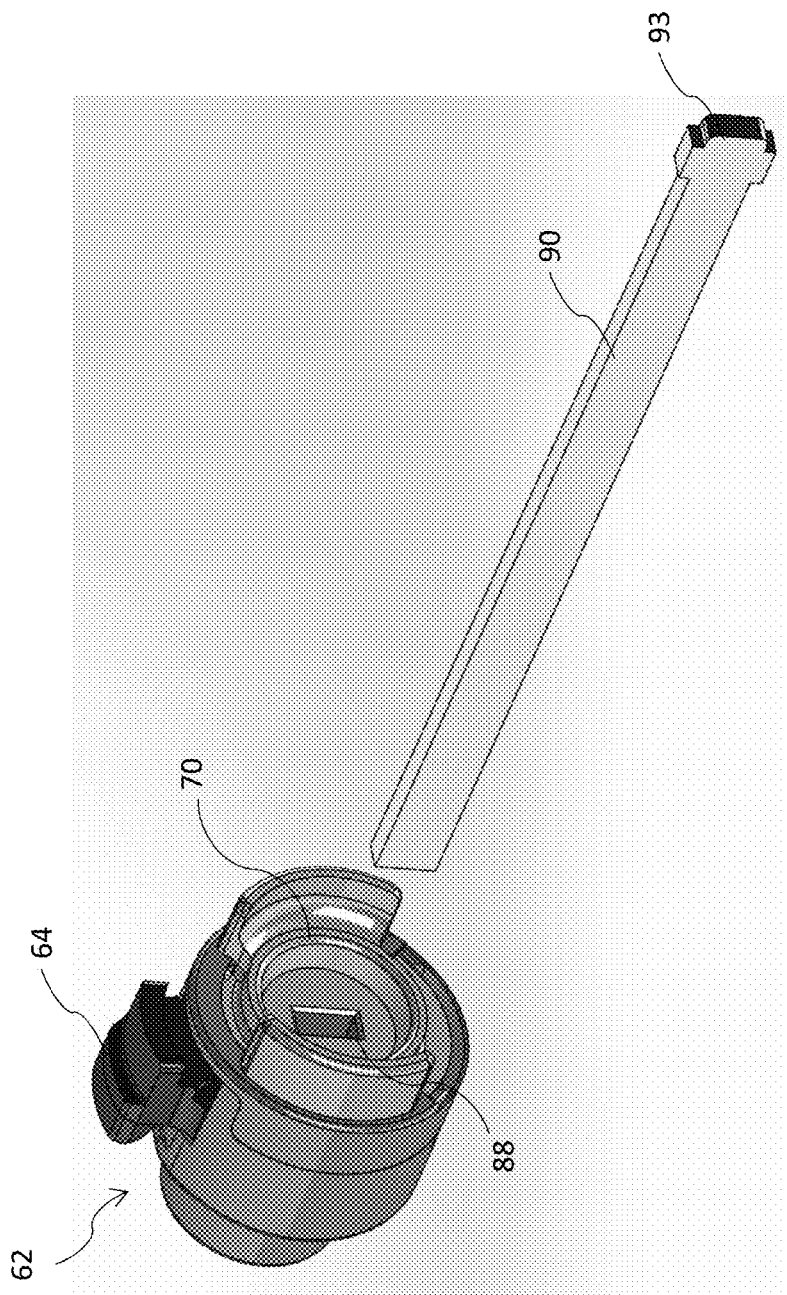

FIG. 18 shows a perspective view of one end of the clutch 62 having the cam component 70. The cam component 70 defines a slot 88 for receiving the locking actuator 90 in the form of a flat bar. The flat bar 90 interlocks with the cam component 70 such that rotation is transmitted between the cam component 70 and the flat bar 90. The locking actuator in the form of the flat bar 90 is coupled to the user operated lock in use. A distal end 93 of the locking actuator 90 is received by a slot in the form of a butterfly slot of the user operated lock. Rotation is transmitted between the butterfly slot of the user actuated lock and the locking actuator 90, and between the locking actuator 90 and the cam component 70. In the present embodiment, the locking actuator 90 is also coupled to another user operated lock associated with another handle on the other side of the door. User operated locks may be in the form of cylinder locks or any suitable form including but not limited to push-button locks or coin operated actuators.

Returning to FIG. 10, another end of the clutch 62 is shown having the bearing component 68. The bearing component 68 is configured to be operationally coupled to the latch assembly 20. A distal end 94 of the bearing component 68 has a coupler 34 comprising a socket for interlocking engagement with the bar 24. In this embodiment the socket and bar 24 are square, however they may have any suitable geometry, for example hexagonal.

The socket 98 has a square lateral section for receiving the square bar 24, and an aperture formed in the bottom of the socket 98 for passage of the locking actuator 90. The square bar 24 has a longitudinal passageway 100 opening at opposite ends. In use, the locking actuator 90 is received within the longitudinal passageway 100.

The torque transmitter 18 has a retaining spring 51 that intersects an opening of the clutch receiver 63. The retaining spring 51 may be deflected sideways, with a tool for example, for passage of the clutch and then released to retain the clutch 62 within the clutch receiver 63.

An embodiment of a method for operating the mechanism 10 will now be described. In a step of the method, a torque is applied to a handle 12 coupled to the torque transmitter 18 of the mechanism 10. In a step, a rotation of the torque transmitter 18 caused by the torque applied to the handle 12 is stopped with the torque transmitter stop 40, which is in the housing 14. In a step, the torque transmitter stop 40 and the torque transmitter 18 are disengaged when the torque so applied exceeds the predetermined torque value.

Further optional steps of the present, but not all embodiments are now described. The torque transmitter 18 moves, for example slides, the torque transmitter stop 40 out of engagement with the torque transmitter 18 when the torque so applied exceeds the predetermined torque value. The cam 46 of the torque transmitter 18 is engaged by a stop element 50 of the torque transmitter stop to arrest the rotation of the torque transmitter. The stop element 50 is reconfigured into the cam follower 50 that is moved by the cam 46 out of engagement therewith when the torque so applied exceeds the predetermined torque. The cam 46 reconfigures the stop element 50 into the cam follower. The cam 46 deflects the stop element 50 to reconfigure the stop element 50 into the cam follower 50. The deflection may be achieved by the cam 46 bending the stop element 50. In another step, the torque transmitter stop 40 is biased towards the torque transmitter.

In another step, the clutch 62 is operated to disable transmission of the torque applied to the handle. The clutch is subsequently operated to enable transmission of the torque applied to the handle and disengage the torque transmitter stop from the torque transmitter.

The housing may be attached by a user, for example a locksmith, to a hinged barrier for operation of the latch assembly 20.

Figure 19:
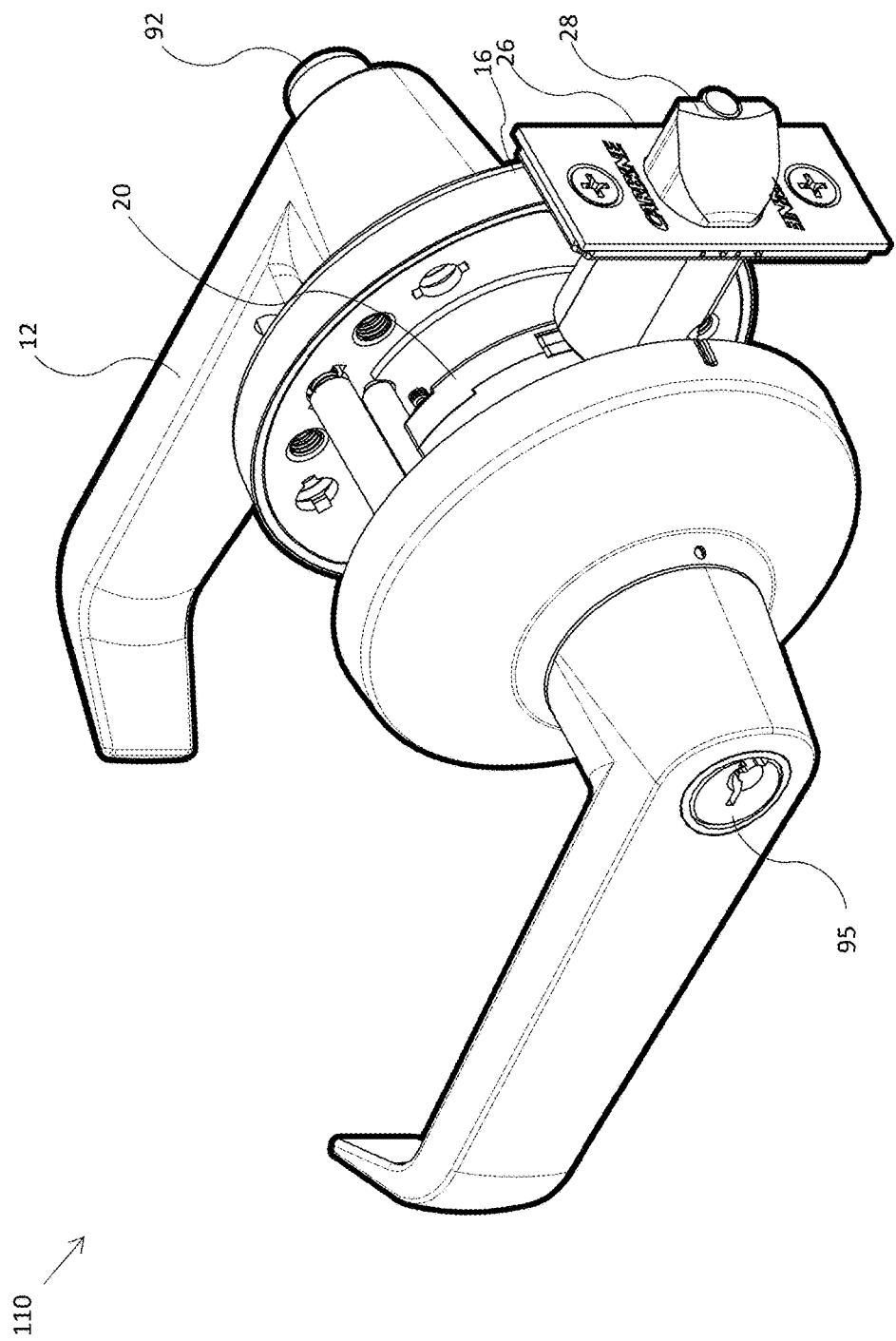
FIG. 19 shows a perspective view of an example of a lockset.
Figure 23:
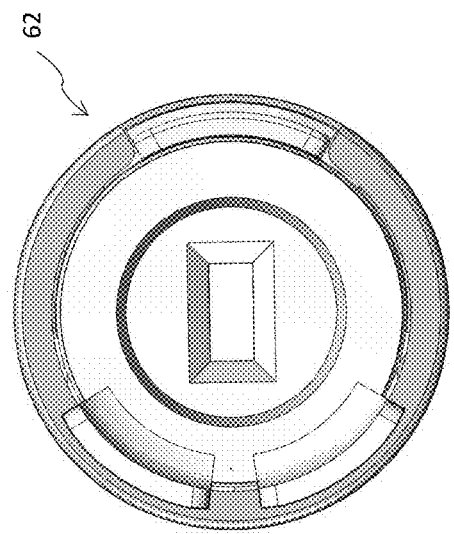
Figure 22:
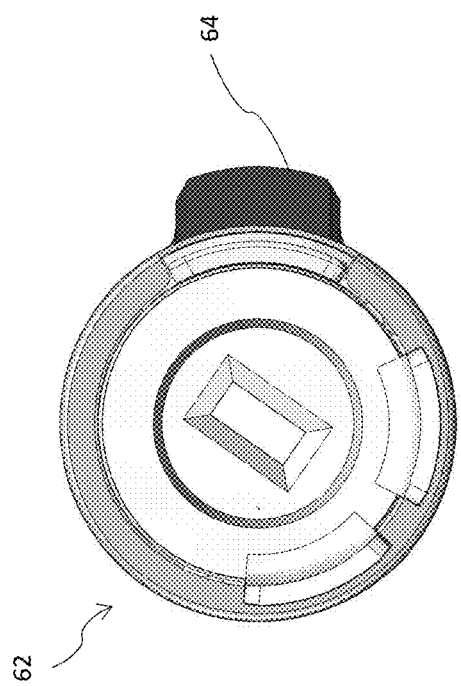
Figure 24:
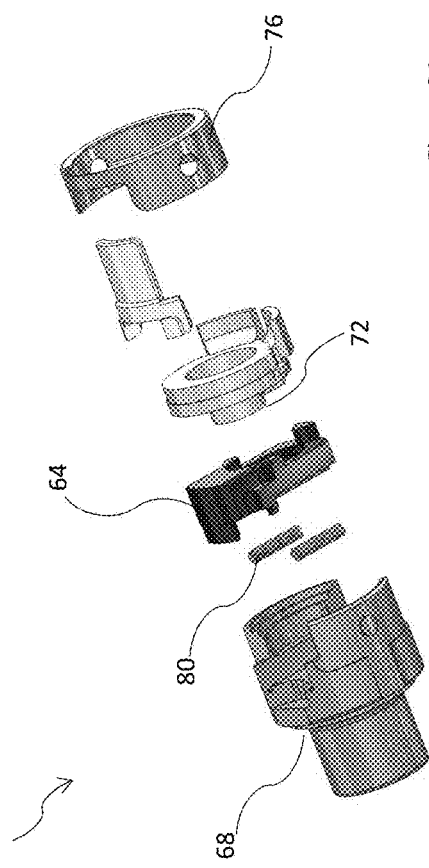
Figure 26:
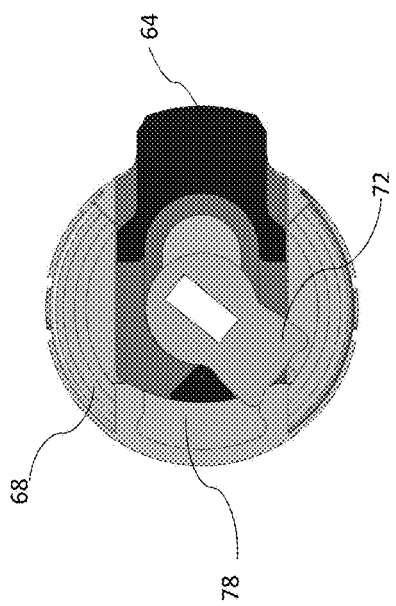
Figure 28:
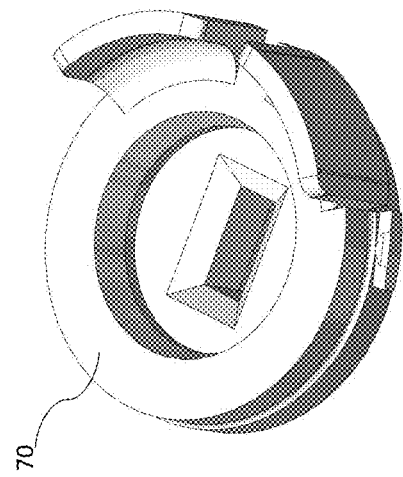
Figure 25:
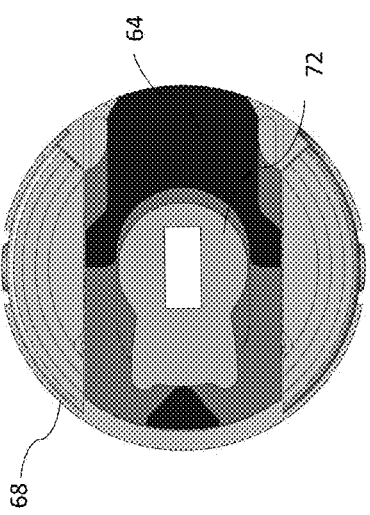
Figure 27:
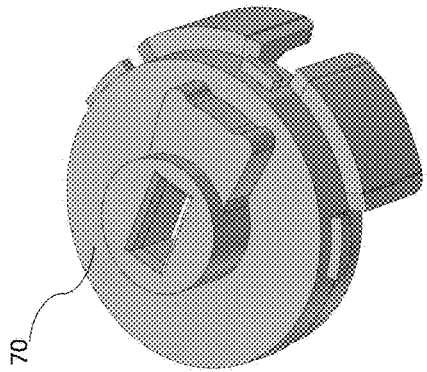
Figure 29:
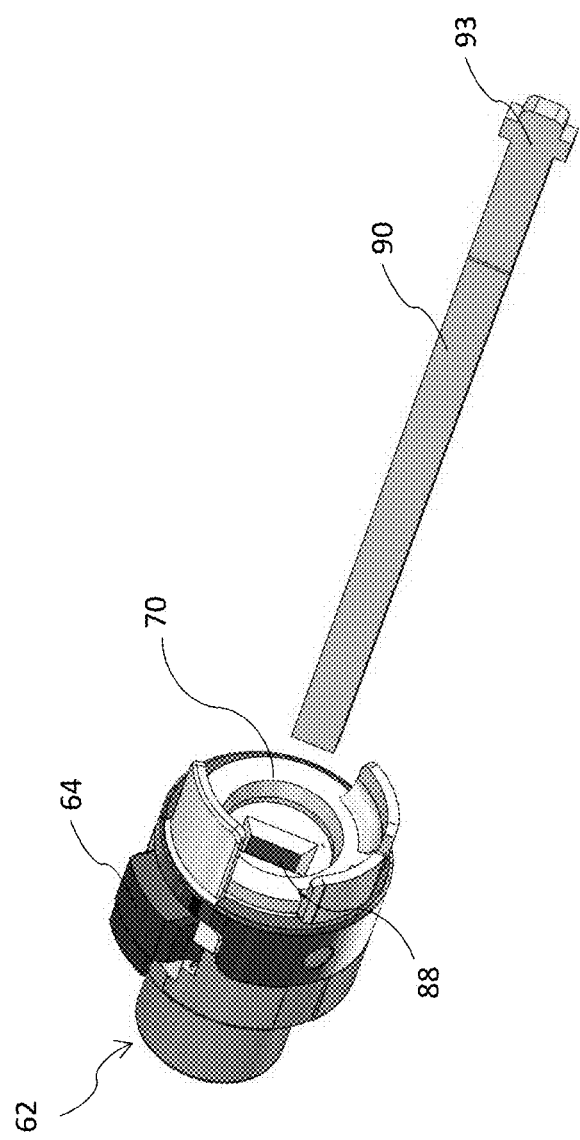

FIG. 19 shows a perspective view of an example of a lockset 100 that may comprise any embodiment of a mechanism for transmitting a torque applied to a handle disclosed above, comprising a user operated lock 95 comprising a lock cylinder. The user operated lock 95 is identical or similar to the user operated lock that may replace the push button lock 92 of FIG. 1.

FIG. 20 shows a perspective view of another example of a lockset 110, where parts similar and/or identical in form and/or function to those in FIG. 19 are similarly numbered. FIGS. 21 to 29 show parts of the lockset 110, where parts similar and/or identical in form and/or function to those in FIGS. 1 to 19 are similarly numbered.

While the hinged barrier is described herein as a door, it may be generally any suitable hinged barrier, for example a gate.

Now that embodiments have been described, it will be appreciated that some embodiments may have some of the following advantages:

A handle coupled to the mechanism may resist rotation when the mechanism is in a locked configuration, which may reduce user confusion, increase trust in the mechanism, and reassure the user that the mechanism is functioning correctly, but give way when forced, which may prevent damage to the locking mechanism, for example.

Variations and/or modifications may be made to the embodiments described without departing from the spirit or ambit of the invention. For example, while the fasteners disclosed herein are generally screws, it will be appreciated that any suitable type of fasteners may be used, for example rivets and clips. Adhesive may be used as a fastener where suitable. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A mechanism for transmitting a torque applied to a handle, the mechanism comprising:
    a housing;
    a torque transmitter for transmitting the torque applied to the handle coupled thereto and having at least a portion within the housing, the torque transmitter comprising a clutch operable by a user operated lock to disable transmission of the torque applied to the handle and operable by the user operated lock to enable transmission of the torque applied to the handle; and
    a torque transmitter stop within the housing, wherein the torque transmitter and the torque transmitter stop are cooperatively arranged for the torque transmitter stop and the torque transmitter to engage to arrest a torque transmitter rotation and further arranged for the torque transmitter stop and the torque transmitter to disengage when the torque so applied exceeds a predetermined torque value.

2. A mechanism defined by claim 1 wherein the torque transmitter and the torque transmitter stop are cooperatively arranged for the torque transmitter stop to engage the torque transmitter to arrest a torque transmitter rotation and to move away from the torque transmitter when the torque so applied exceeds a predetermined torque value.

3. A mechanism defined by claim 2 wherein the torque transmitter stop is movably mounted within the housing and the torque transmitter is arranged to cooperate with the torque transmitter stop to move the torque transmitter stop out of engagement with the torque transmitter when the torque so applied exceeds the predetermined torque value.

4. A mechanism defined by claim 3 wherein the torque transmitter comprises a cam and the torque transmitter stop comprises a stop element, wherein the cam and the stop element are cooperatively arranged for the stop element to engage the cam to arrest the torque transmitter rotation, and the stop element is arranged to be reconfigured into a cam follower that is arranged to be moved by the cam out of engagement therewith when the torque so applied exceeds the predetermined torque.

5. A mechanism defined by claim 4 wherein the stop element is arranged to be reconfigured into the cam follower by the cam.

6. A mechanism defined by claim 5 wherein the stop element is arranged to be deflected by the cam to reconfigure the stop element to the cam follower.

7. A mechanism defined by claim 4 wherein the stop element comprises a resilient stop element.

8. A mechanism defined by claim 7 wherein the resilient stop element comprises a spring.

9. A mechanism defined by claim 3 wherein the torque transmitter stop is slidingly mounted within the housing, and the torque transmitter is arranged to cooperate with the torque transmitter stop to slide the torque transmitter stop out of engagement with the torque transmitter when the torque so applied exceeds the predetermined torque value.

10. A mechanism defined by claim 1 configured for the torque transmitter stop to be fixed relative to the housing when disengaged from the torque transmitter.

11. A mechanism defined by claim 10 wherein the torque transmitter stop comprises a passageway for a fastener and the housing comprises a fastener receiver arranged for receiving the fastener when disposed in the passageway and when the torque transmitter stop is disengaged from the torque transmitter.

12. A mechanism defined by claim 1 wherein the torque transmitter stop is biased by at least one biasing element towards the torque transmitter.

13. A mechanism defined by claim 1 wherein the torque transmitter is configured for removable attachment of the handle thereto.

14. A mechanism defined by claim 1 wherein the torque transmitter has the handle attached thereto.

15. A mechanism defined by claim 1 wherein the housing is configured to be attached to a hinged barrier for operation of a hinged barrier latch assembly.

16. A mechanism for transmitting a torque applied to a handle, the mechanism comprising:
- a torque transmitter for transmitting the torque applied to the handle coupled thereto, the torque transmitter comprising a clutch operable by user operated lock to disable transmission of the torque applied to the handle and operable by the user operated lock to enable transmission of the torque applied to the handle; and
- a torque transmitter stop, wherein the torque transmitter and the torque transmitter stop are cooperatively arranged for the torque transmitter stop and the torque transmitter to engage to arrest a torque transmitter rotation and further arranged for the torque transmitter stop and the torque transmitter to disengage when the torque so applied exceeds a predetermined torque value.

* * * * *